United States Patent [19]
Reuter

[11] Patent Number: 5,581,889
[45] Date of Patent: Dec. 10, 1996

[54] HAND-HELD GARDEN TOOL

[75] Inventor: Donald R. Reuter, Waukesha, Wis.

[73] Assignee: RLJ, Inc., Waukesha, Wis.

[21] Appl. No.: 306,104

[22] Filed: Sep. 14, 1994

[51] Int. Cl.$^6$ ........................................................ A01B 1/10
[52] U.S. Cl. ............................ 30/142; 30/353; 30/355; 30/314; 30/171; 30/518; 172/378
[58] Field of Search ............................ 30/355, 353, 357, 30/287, 314, 144, 142, 136, 169, 171, 166.3, 517, 518, 501–503.5; 172/378, 379, 380, 381

[56] References Cited

U.S. PATENT DOCUMENTS

| | | | |
|---|---|---|---|
| 690,839 | 1/1902 | Coyan | 30/169 |
| 1,117,355 | 11/1914 | Erikson | 30/353 |
| 1,261,954 | 4/1918 | Newman | 30/142 |
| 1,301,297 | 4/1919 | Newman | 30/353 |
| 1,492,134 | 4/1924 | Kyle | 30/355 |
| 1,505,444 | 8/1924 | Swanson | 30/355 |
| 1,679,806 | 8/1928 | Bockstadter | 172/381 |
| 2,753,632 | 7/1956 | Varn | 30/355 |
| 4,002,207 | 1/1977 | Bartz | 172/378 |

FOREIGN PATENT DOCUMENTS 0568829  4/1945  United Kingdom ..................... 30/142

Primary Examiner—Rinaldi I. Rada
Assistant Examiner—Allan M. Schrock
Attorney, Agent, or Firm—Andrus, Sceales, Starke & Sawall

[57] ABSTRACT

A versatile hand-held garden tool for cultivating, digging, weeding, pruning and trimming has a blade, a handle and a neck angling upwards from the blade that connects the blade to the handle. The blade has a body portion that is preferably 5"–7" long and a tip portion angling upwards from the body portion that is preferably about 1 inch long. The body portion has two edges, one edge is serrated and the other edge is beveled. The tip portion has a beveled edge. It is preferred that the handle have a V-shaped cross section to facilitate the mounting of a grip. The garden tool can be made by cutting a blank from a web of cold rolled steel having a thickness of about 0.075 inches, coining the beveled edges into the blank, and forming the tool by bending the blank. It is then preferred to heat treat and plate the cold rolled steel.

15 Claims, 2 Drawing Sheets

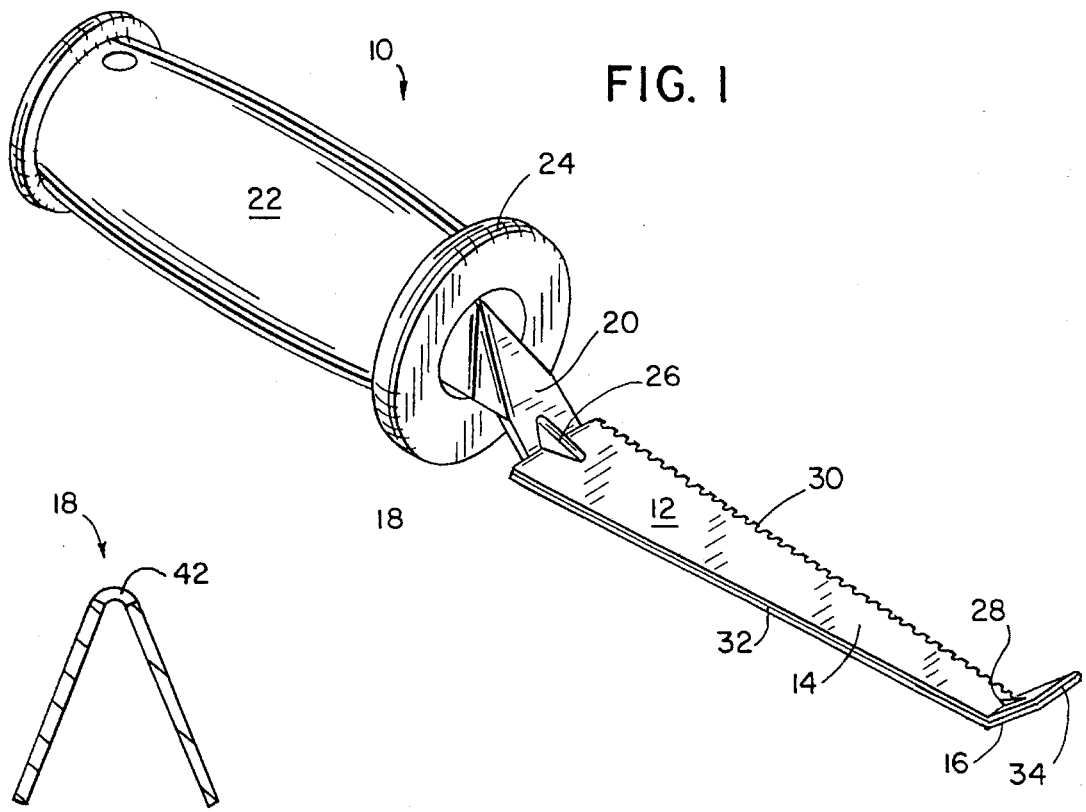
FIG. 1
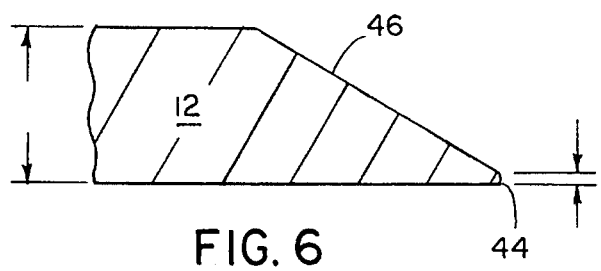
FIG. 4
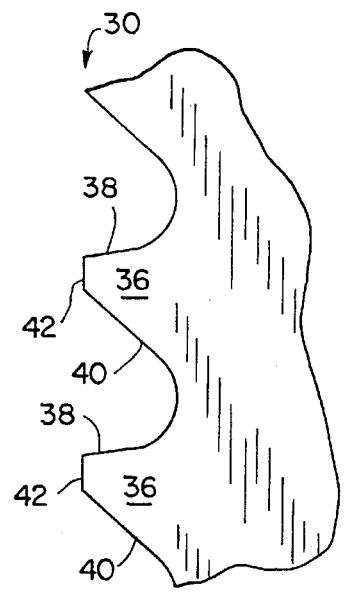
FIG. 5
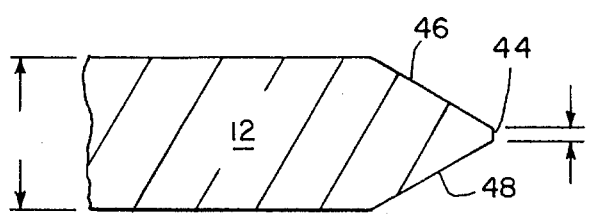
FIG. 6
FIG. 7

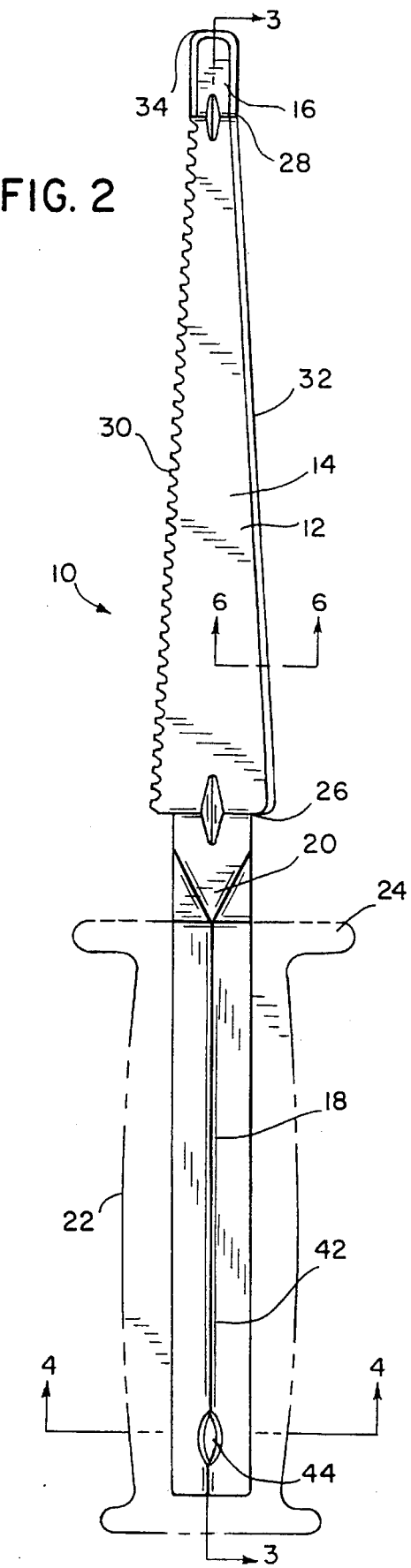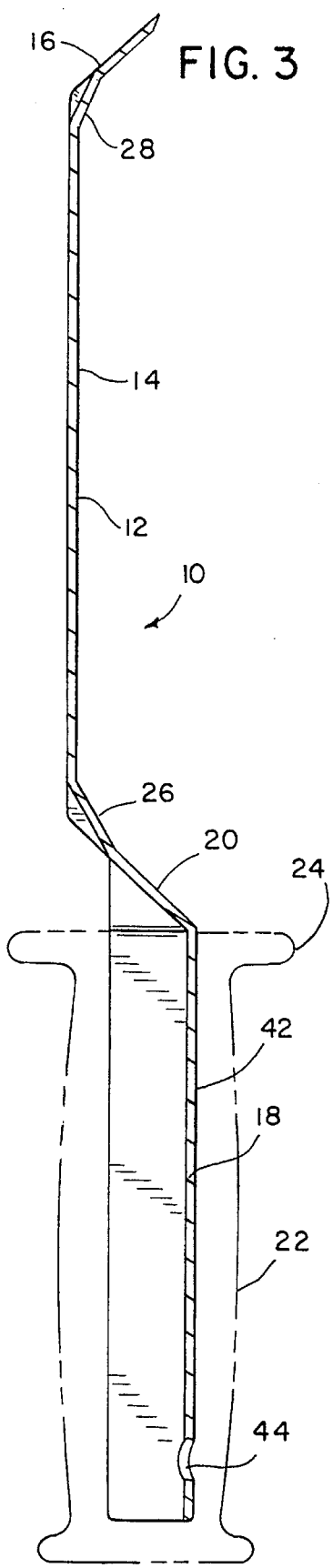

HAND-HELD GARDEN TOOL

FIELD OF THE INVENTION

The invention relates to garden tools, and in particular hand held garden tools that are normally held by a single hand.

BACKGROUND OF THE INVENTION

Gardening involves several tasks such as weeding, digging, cultivating, pruning and trimming. A variety of tools are normally used to make these tasks easier. For instance, saws or clippers can be used to prune and trim, a weed digger can be used for weeding, and a spade or hoe can be used for cultivating and digging. Of course, different gardeners may prefer to use other kinds of tools to accomplish these various tasks.

For the sake of convenience, it is desirable to provide a hand held garden tool that is useful for all or some of these separate gardening tasks.

SUMMARY OF THE INVENTION

In one aspect, the invention is directed to a versatile hand-held garden tool that is useful for cultivating, digging, weeding, pruning and trimming. In another aspect, the invention is directed to a method of making such a hand-held garden tool.

The hand-held garden tool of this invention has a blade with a body portion and a tip portion that angles upwards from the body portion. The blade is made of a rigid material. The body portion of the blade has two edges. It is preferred that one of the edges be serrated and that the other edge be beveled. The tool has a neck that angles upwards from the blade to connect the blade to a handle. It is also preferred that the tip portion of the blade have an edge that is beveled at least in part. The tool can have a grip around the handle, and it is preferred that the grip have a stop located towards the neck of the tool to prevent a users hand from slipping forward of the grip.

The inventive method for making a garden tool of this kind involves cutting a blank from a web of cold rolled steel, beveling at least one edge of the blank to form a beveled edge to the body portion of the blade and forming the body portion and the tip portion of the blade, the neck and the handle by bending the blank. The beveled edge is formed by coining the edge so that the edge has a flat spot of no more than 0.033 inches. The method also preferably includes the forming of gussets at the bend between the body portion of the blade and the tip portion of the blade and another gusset at the bend between the body portion of the blade and the neck. After coining and forming the blank of cold rolled steel, it is preferred to heat treat and plate the cold rolled steel. A rubber grip can be secured to the handle.

A primary object of the invention is to provide a hand-held garden tool that is useful for weeding, digging, cultivating, pruning and trimming. The garden tool of the present invention can accomplish these several tasks. The tip portion of the blade facilitates weeding. Also, the tool is capable of pruning and trimming as well as cultivating and digging in hard to reach locations. The preferred embodiment of the garden tool accomplishes these objectives nicely by using a blade having a body portion with a length between 5 to 7 inches. This length is sufficient to allow a proper sawing action along the serrated edge of the body portion of the blade which is important for pruning and trimming. The length also provides a sufficient reach for cultivation with the tip portion of the blade in hard to reach locations.

Another object of the invention is to provide a tool that helps protect the hand of a user. The invention accomplishes this object by using a neck to connect the handle to the body portion of the blade that is bent upwards to provide clearance for the user's knuckles. The invention also provides a handle grip with a stop that helps to keep the user's hand from slipping forward onto the blade even when wet.

Another object of the present invention to provide a garden tool that is rigid yet able to slide into the ground easily. The preferred embodiment of the invention can accomplish this objective by using the heat treated cold rolled steel with a sufficient thickness and bevelling one or more edges of the tool blade.

Another object of the present invention is to provide a cost effective method for providing a beveled edge to the blade that is sharp enough for efficient gardening. The method disclosed herein accomplishes this object by coining beveled edges so that it is not necessary to file or grind the beveled edges.

BRIEF DESCRIPTION OF THE DRAWINGS

FIG. 1 is a perspective view of a garden tool in accordance with the present invention.

FIG. 2 is a top view of the garden tool shown in FIG. 1.

FIG. 3 is a side view of the garden tool shown in FIG. 1.

FIG. 4 is a cross sectional view taken along lines 4—4 in FIG. 2.

FIG. 5 is a detailed drawing of a serrated edge of the garden tool shown in FIG. 1.

FIG. 6 is a schematic drawing illustrating a cross section of a beveled edge of the garden tool shown in FIG. 1.

FIG. 7 is a schematic drawing illustrating a cross section of a beveled edge of another embodiment of the garden tool shown in FIG. 1.

DETAILED DESCRIPTION

1. Prior Art

One type of weed digger that is known has a blade with a body portion and a tip portion wherein the tip portion angles upward from the body portion. The body portion is approximately 3 inches long and the tip portion is approximately one-half inch long. The body portion of the blade is connected to a handle via a neck which also angles upwards from the body portion. Thus, the handle is offset upwards from the blade by about one-half inch. In this weed digging tool, the tip portion, the body portion, the neck, and the handle are an integral sheet of metal that is sufficiently thin so that the tip and body portions can easily slide into and through soil, but the tool can also bend from the pressure of the soil. The weed digging tool is effective for weeding, particularly because of the angled tip portion of the blade and the thin metal used to make the blade. However, the tool lacks precision because the blade bends.

2. Present Invention

The garden tool 10 of the present invention is an improved form of the above described weeding digging tool; however the garden tool 10 of the present invention also incorporates other features that make tool 10 more suitable for cultivating, digging, pruning and trimming as well as weeding.

Referring to FIGS. 1–3, the garden tool 10 has a generally triangular shaped blade 12. The blade 12 has a body portion 14 and a tip portion 16. The tip portion 16 angles upward from the body portion 14. The tip portion 16 of the blade 12 angles upwards from the blade portion 14 at an angle between 43°–53°, and preferably, 48°.

The garden tool 10 also has a handle 18, and a neck 20 that connects the handle 18 to the body portion 14 of the blade 12. It is preferred that the neck 20 angle upwards from the blade 12 so that the handle 18 is offset upwards from the blade 12 by about 1". The neck 20 angles upward from the body portion 14 of the blade 12 at an angle between 43°–53°, preerably 48°. The 1" offset is useful for protecting the knuckles of a user.

A grip 22 is provided around the handle 18. The grip 22 has a stop 24 located towards the neck 20. The grip stop 24 extends outward from the handle 18, and helps to prevent a users'hand from slipping forward of the grip 22. It is preferred that the grip 22 be rubber so that the users'hand will not slip even if the tool 10 is wet. It is also preferred that the grip be red or some other bright color so it is easy to see in the yard.

It is preferred that the handle 18, the neck 20, and the blade 12 be made of an integral piece of rigid material such as heat treated cold rolled steel that is at least 0.050 inches thick. The blade 12, the neck 20 and the handle 18 should not bend when the tool 10 is in use. Rigid construction improves the precision of the tool 10. A neck gusset 26 is preferably located at a bend between the neck 20 and the blade 12 for support. A tip gusset 28 is preferably located at a bend between the tip portion 16 and the body portion 14 of the blade 12 for support.

The body portion 14 of the blade 12 is preferably about 5"–7" long and the tip portion is preferably about 1" long. The body portion 14 of the blade 12 has a serrated edge 30 and a beveled edge 32. The serrated edge 30 is useful for sawing and pruning. The serrated edge 30 is preferably serrated along the entire edge of the body portion 14 of the blade 12, which is preferably between 5"–7" long. A length of 5"–7" is practical to allow a proper sawing or pruning motion.

The beveled edge 32 of the body portion 14 allows the blade portion 14 to more easily pass through soil even though the body portion 14 should be substantially thick so that the blade 12 is rigid. The tip portion 16 of the blade 12 has an edge 34 around the three exposed sides that is also preferably beveled. The 5"–7" length for the body portion 14 of the blade 12 is also preferred to provide sufficient reach for cultivation with the tip portion 16 in hard to reach places, and because not many weeds have roots longer than 6" long, the tip portion 16 is therefore effective for completely digging most weeds.

Referring to FIG. 5, the serrated edge 30 of the body portion 14 of the blade 12 has teeth 36 which are preferably pointed towards the tip portion 16 of the blade 12. It is preferred that the teeth 36 point forward towards the tip portion 16 of the blade 12 so that the leading edge 38 of each tooth 36 is substantially perpendicular to the centerline of the body portion 14 of the blade 12, and the trailing edge 40 of each tooth 36 is preferably at a 45° angle to the centerline of the body portion 14 of the blade 12. Each tooth 36 also has a flat spot 42 at the tip between the leading 38 and trailing 40 edge. It is preferred that the flat spot 42 on the edge of the teeth 36 of the serrated edge 30 be 0.060 inches. The flat spot 42 facilitates fabrication as will be discussed later, and also prevents the serrated edge 30 from being excessively sharp. The serrated edge 30 can be beveled if desired, but it is not preferred to bevel the serrated edge 30.

Referring to FIGS. 2–4, the handle 18 has a longitudinal axis 42 that is substantially straight. The handle 18 is bent along the longitudinal axis 42 so that in cross section the handle 18 is substantially V-shaped (e.g. FIG. 4). The V-shaped handle 18 facilitates proper attachment of the grip 22 to the handle 18. Normally, the three point contact of the V-shaped handle 18 should be sufficient to secure the grip 22, but adhesive can be used if necessary. The handle 18 also has a hole 44 which is useful during the fabrication of the tool 10 which is described below.

The garden tool 10 as described above can be made by the method now described. The blade 12, neck 20, and handle 18 should be made from an integral piece of heat treated cold rolled steel. It is preferred that a blank from a web of cold rolled steel having a thickness of at least 0.050 inches, and preferably 0.075 inches, be cut using a blank die at about 80–100 tons. The teeth 36 of the serrated edge 30 along the body portion 14 of the blade 12 should be cut into the blank. The flat spot 42 on the teeth 36 should be about 0.060 inches to prevent the die block from chipping away from extended use. The blank of cold rolled steel should also have hole 44 cut into the handle 18.

The beveled edges 32 and 34 on the blade 12 are formed on the blank using a coin die at 200–220 tons. Referring in particular to FIGS. 6 and 7, the beveled edges 32 and 34 of the blade 12 preferably have a flat spot 44 that is a maximum of 0.002 inches. The beveled edges can have either a single beveled surface 46 such as shown in FIG. 6, or a dual beveled surface such as shown in FIG. 7 (e.g., the top beveled surface 46 and the bottom beveled surface 48). A coin die at 200–220 tons can produce a beveled edge as shown in FIGS. 6 or 7 having the flat spot with the maximum of 0.002 inches in width. The flat spot 44 prevents the beveled edges from becoming excessively sharp. Coining the beveled edges 32 and 34 of the blade 12 eliminates the need for expensive grinding and filing. The blank is then preferably bent in a form die at 80–100 tons to form the body portion and tip portion of the blade, the neck 20, the gussets 26 and 28, and the V-shaped handle 18.

After the beveled edges 32 and 34 have been coined, and the blank has been bent into form, the tool 10 is heat treated at 800°–1200° F. to make the steel more durable. Thereafter, the tool can be plated with zinc or chrome. The hole 44 in the handle 18 can be used to dip the tool 10 for plating.

It is recognized that various equivalents, alternatives and modifications are possible and should be considered within the scope of the appended claims.

I claim:

1. A hand-held garden tool comprising:

a rigid elongated blade having a flat, body portion of uniform thickness with a top side, a bottom side and two edges and a tip means for weeding and digging, the tip means being located at a free end of the blade and angling upwards from the plane of the body portion, the body portion and the tip means being connected at a straight bend line;

a handle having a longitudinal axis that is substantially parallel to the flat, elongated blade;

a rigid neck connecting the body portion of the blade to the handle, the neck angling upwards from the blade so that the handle is offset above the blade;

wherein the body portion of the blade is elongated in a direction substantially parallel to the longitudinal axis of the handle and one of the edges of the body portion of the blade is serrated.

2. A garden tool as recited in claim 1 wherein the other edge of the body portion of the blade is beveled.

3. A garden tool as recited in claim 1 wherein the tip means comprises a tip portion of the blade having an edge which is beveled at least in part.

4. A garden tool as recited in claim 1 wherein the handle, the neck and the blade are made from a single piece of high carbon cold rolled steel having a thickness of at least 0.050 inches.

5. A garden tool as recited in claim 4 wherein the handle has a hole therethrough.

6. A garden tool as recited in claim 1 further comprising a grip around the handle, the grip having a stop located towards the neck which extends outward from the handle to prevent a hand from slipping forward of the grip.

7. A garden tool as recited in claim 1 wherein the handle has a longitudinal axis that is substantially straight and a cross section perpendicular to the longitudinal axis that is substantially V-shaped; and the garden tool further comprises a grip mounted around the handle.

8. A garden tool as recited in claim 1 wherein the tip means comprises a tip portion of the blade which angles upward from the plane of the body portion of the blade at an angle between 43 and 53 degrees.

9. A garden tool as recited in claim 1 wherein the neck bends upward from the body portion of the blade at an angle of 43 to 53 degrees.

10. A garden tool as recited in claim 1 wherein the serrated edge has teeth which are pointed forward towards the tip means of the blade.

11. A garden tool as recited in claim 10 wherein the teeth on the serrated edge each have a flat spot at a point of each tooth.

12. A garden tool as recited in claim 1 wherein the body portion of the blade is between 5 and 7 inches long.

13. A hand-held garden tool comprising:

a rigid elongated blade having a flat, body portion of uniform thickness with a top side and a bottom side, and a tip means for weeding and digging, the tip means being located at a free end of the blade and angling upward from the plane of the body portion, the body portion and the tip means being connected at a straight bend line;

a handle; having a longitudinal axis that is substantially parallel to the flat, elongated blade;

a rigid neck connecting the body portion of the blade to the handle and angling upwards from the body portion so that the handle is offset above the blade;

wherein the body portion of the blade is elongated in a direction substantially parallel to the longitudinal axis of the handle, and the body portion has two edges and at least one of the edges of the body portion of the blade is beveled.

14. A garden tool as recited in claim 13 wherein the tip means comprises a tip portion of the blade having an edge which is beveled at least in part.

15. A hand-held garden tool comprising:

a rigid elongated blade having a flat, body portion of uniform thickness with a top side, a bottom side and two edges and a tip portion located at a free end of the blade which angles upwards from the plane of the body portion the body portion and the tip means being connected at a straight bend line;

a handle having a longitudinal axis that is substantially parallel to the flat, elongated blade;

a rigid neck connecting the body portion of the blade to the handle, the neck angling upwards from the blade so that the handle is offset above the blade;

wherein the body portion of the blade is elongated in a direction substantially parallel to the longitudinal axis of the handle and one of the edges of the body portion of the blade is serrated and the other edge of the body portion of the blade is beveled.

* * * * *